Dec. 16, 1952   C. C. UTZ   2,621,919
WHEEL SUSPENSION

Filed Nov. 30, 1946   2 SHEETS—SHEET 1

INVENTOR.
Chester C. Utz.
BY
Harness and Harris
ATTORNEYS.

Dec. 16, 1952 C. C. UTZ 2,621,919
WHEEL SUSPENSION
Filed Nov. 30, 1946 2 SHEETS—SHEET 2

INVENTOR.
Chester C. Utz.
BY
Harness and Harris
ATTORNEYS.

Patented Dec. 16, 1952

2,621,919

UNITED STATES PATENT OFFICE 2,621,919

WHEEL SUSPENSION

Chester C. Utz, Southfield Township, Oakland County, Mich., assignor to Chrysler Corporation, Highland Park, Mich., a corporation of Delaware Application November 30, 1946, Serial No. 713,314

7 Claims. (Cl. 267—20)

This application relates to wheel suspension apparatus for motor vehicles and more particularly to means for mounting a coil spring in an independent wheel suspension assembly.

It is an object of the invention to mount the spring of an independent wheel suspension assembly so that the forces acting upon it are pure compression forces and that no bending forces are applied during the rising and falling movement of the wheel. Pivotal supports are provided for each end of the spring which cooperate with the motions of the upper and lower control arms to assure that the axis of the spring will be normal to the applied forces of compression and that no bending will occur.

An additional object of the invention is to simplify the construction of the frame and eliminate unnecessarily complicated structural forms thereof which are often required to receive the spring. Each end of the spring is supported by a control arm of the wheel suspension assembly in my novel construction.

The novel suspension assembly is easily serviced. The entire spring may be changed by jacking up the car, removing the upper and lower shock absorber pivot connections and removing the spring. This entire disassembly may be effected without changing the castor and camber adjustments of the wheel.

A further object of the invention is to provide a construction that is adapted for bench assembly of the wheel suspension apparatus so that the bench assembly may be secured as a unit to the sprung portion of the vehicle.

The invention herein will be described with reference to the front suspension of a motor vehicle, although it is to be understood that it would be applied to the rear suspension of a rear drive vehicle where swing type axles are used and similarly to either front or rear suspension of a front drive vehicle.

Referring to the drawings.

Figure 1:
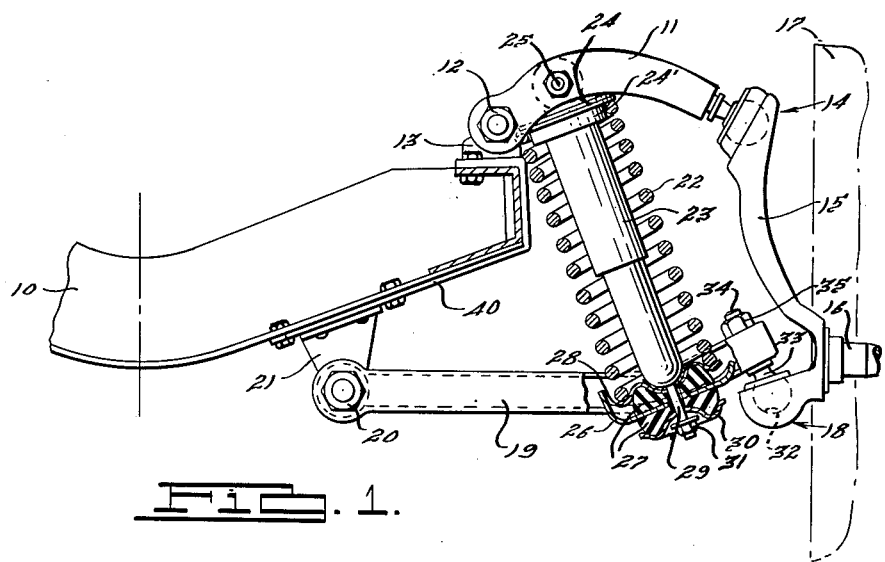
Fig. 1 is a partially vertical elevation of the front suspension of a motor vehicle.
Figure 2:
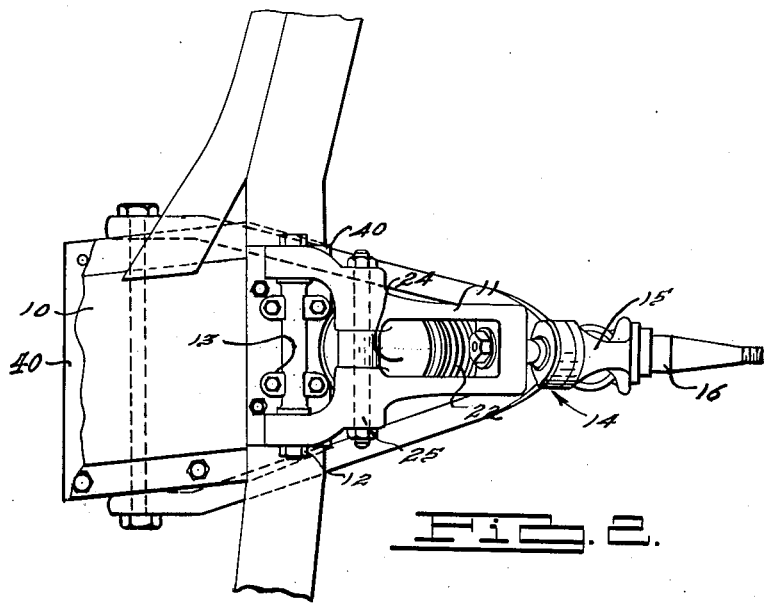
Fig. 2 is a plan view of Fig. 1.

Reference character 10 designates a vehicle frame. A member 40 to be described herein is bolted to the frame. This assembly will be referred to as the frame. An upper control arm 11 is pivotally connected to the frame as indicated at 12 by means of a bracket structure 13. The control arm 11 is bifurcated so that it will extend on opposite sides of the bracket structure 13. The other end of the control arm 11 is connected by universal joint structure 14 to the upper end of a part 15 having a spindle 16 upon which a steerable ground wheel 17 may be rotatably mounted. The lower end of the part 15 is connected by universal joint 18 to one end of a lower control arm 19. The other end of the control arm 19 is pivotally connected as indicated at 20 to a bracket 21 which is secured to the frame 10.

The said other end of the lower control arm 19 may be bifurcated so as to extend on opposite sides of the bracket structure 21. A coil spring 22 is positioned in operative engagement with the upper control arm 11 and the lower control arm 19. The coil spring 22 forms a resilient support for the sprung portion of the vehicle. A telescopic hydraulic shock absorber 23 of conventional design is positioned axially of the coil spring 22. Control arm 11 has a depending element 24 supported by a transverse rod 25. The element 24 has an abutment 24' which extends within the spring and locates the upper end of the spring. The lower control arm 19 is provided with a laterally extending ledge member 26 and a pair of resilient bumper members 27 which abut opposite sides of ledge member 26. A plate or cup element 28 rests upon the upper bumper member 27 and supports the lower end of the spring 22 and the lower end of the shock absorber housing. A rod 29 secured to the shock absorber 23 extends through the resilient members 27 and through the ledge member 26. A cap element 30 is positioned on the lower side of the resilient bumper 27. Nut 31 on shock absorber rod 29 may be drawn up until the shock absorber is secured to the lower control arm 19 through the members just described. It should be noted that this construction supports the lower end of the spring in a plane which is substantially coplanar with the axis about which the spring rocks when the lower control arm is elevated or depressed.

A universal joint 18 comprising a socket 32 formed in element 15 and a cooperating ball 33 is secured to the lower control arm by means of a threaded extension 34 on ball 33 and a nut 35.

Figure 3:
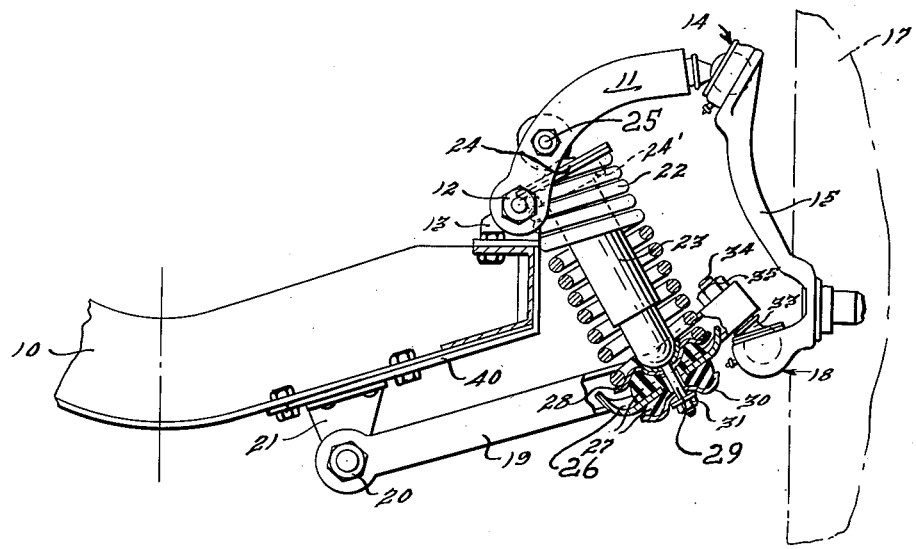
Fig. 3 is a view similar to Fig. 1 but showing the wheel in a raised position with the spring under compression.

The spring 22 is positioned between the upper and lower control arms. The cup element 28 which is adapted to support spring 22 on control arm 19 is positioned relatively near the wheel 17 while the upper end of the spring 22 is supported relatively near the frame. The pivotal connections 12 and 20 of the control arms 11 and 19 respectively, are laterally spaced so that the control arm 19 is relatively long compared to the control arm 11. When the wheel strikes a bump the part 15 and spindle 16 are raised. Control arms 11 and 19 tend to rotate in a counterclockwise direction. The relatively long lever arm of the lower end of the spring 22 from the pivotal mounting 20 causes the lower end of the spring to rise a considerable distance. The short lever arm of the upper end of the spring relative to the pivotal mounting 12 raises the upper portion of the spring a very small amount. The relatively great upward movement of the lower end of the spring as compared to the upper portion of the spring causes a compression of the spring 22 which resists the upward motion of the part 15, spindle 16, and wheel 17. Fig. 3 illustrates the structure of Fig. 1 when the spring is compressed and the wheel raised. The shock absorber 23 operates in the usual manner.

It should be noted that this construction places the spring load on the upper control arm 11 and not on the frame cross member. With proper positioning of the spring 22 it is possible to provide substantially a pure compression of the spring. Present independent wheel suspension systems impart a combination of compressing and bending forces on their springs. The pure compression of the spring gives an easier spring action and a longer spring life. The pivotally mounted supports 24 and 28 assure that the ends of the spring are always normal to the axis of the spring and thereby assure that the force acting on the spring is a pure compression force without any tendency to bend the spring. The depending element 24 is rotatably mounted on the upper control arm 11 for this purpose. The cap element 28 is capable of rocking on the upper bumper member 27 by compression of a portion of the latter to provide the pivotal mounting for the lower end of the spring 22. The fact that the support for the upper end of the spring is movable with the upper control arm 11 reduces the amount of pivoting required by the depending element 24 to prevent bending of the spring 22.

This construction also simplifies the construction of the frame cross member 10. In many present independent suspension systems rather complicated structure is required in the frame cross member 10 to provide a support for the upper portion of the spring.

In the event of spring failure, the spring 22 may be removed by a minimum of operations when the vehicle is jacked up and the frame cross member 10 is supported by other means than the spring 22. The spring may be removed by disconnecting the pivotal mounting 25 and the nut 31. The shock absorber 23 and spring 22 may then be removed without disturbing the wheel settings for castor and camber. The pivotal connections at 12 and 20 and the universal joints 14 and 18 are untouched.

Figure 4:
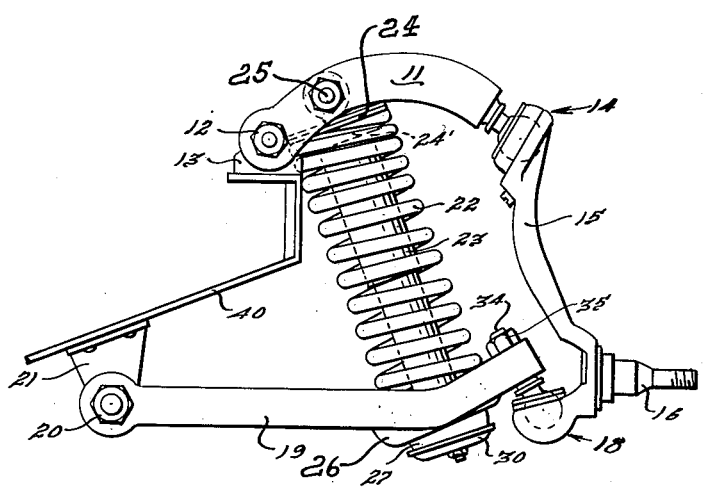
Fig. 4 is an elevation of the unit constructed as a bench assembly.

Fig. 4 illustrates that the device is adapted to be assembled as a bench assembly. In the Fig. 4 construction the upper control arm 11, lower control arm 19, and part 15 are assembled with the spring 22 on a bracket or plate member 40. This comprises a unit which may be a bench assembly if desired. The entire unit may be installed on the vehicle by bolting the member 40 to the frame. This simplifies assembly problems and if desired in the event of replacement or failure of component parts of the independent suspension assembly the entire unit may be removed from the vehicle frame and a new unit substituted with considerably less labor involved than is required with the extensive disassembly, reassembly, and castor and camber adjustments required by present suspension systems. In Fig. 4 the parts are shown in their loaded position corresponding to Fig. 1 although the spring 22 when unrestrained would deflect the control arms downwardly.

I claim:

1. In a wheel suspension assembly a plate, an upper control arm rotatably mounted on said plate, a lower control arm rotatably mounted on said plate, means associated with said control arms for rotatably supporting a wheel and a spring having one end thereof pivotally mounted on said lower control arm for oscillation about an axis in close proximity to that end and the other end pivotally mounted on said upper control arm thereby forming a self contained unit capable of being mounted on a vehicle.

2. In a motor vehicle having a sprung portion and a road wheel, upper and lower control arms rotatably mounted on said sprung portion and extending to one side thereof, means associated with the extended ends of said control arms for rotatably supporting said road wheel, a coil spring, a plate member pivotally mounted on said lower control arm intermediate the rotatable mounting of said arm and said wheel, a second plate member pivotally mounted on said upper control arm intermediate the rotatable mounting of said last mentioned arm and said wheel, a coil spring having one end mounted on each of said plate members and at least one of said plate members having its pivotal mounting substantially coplanar with an end of said spring.

3. In a motor vehicle having a sprung portion and a road wheel, upper and lower control arms rotatably mounted on said sprung portion and extending to one side thereof, means associated with the extended ends of said control arms for rotatably supporting said road wheel, a coil spring, a plate member pivotally mounted on said lower control arm intermediate the rotatable mounting of said arm and said wheel, a second plate member pivotally mounted on said upper control arm intermediate the rotatable mounting of said last mentioned arm and said wheel, a coil spring having one end mounted on each of said plate members and at least one of said plate members having its pivotal mounting substantially coplanar with an end of said spring, and extensible means operably connecting said plate members so that under substantially all conditions of movement of said control arms said plate members are retained in parallel relationship.

4. In a motor vehicle having a sprung portion and a road wheel, upper and lower control arms rotatably mounted on said sprung portion and extending to one side thereof, means associated with the extended ends of said control arms for rotatably supporting said road wheel, a resilient member supported by said lower control arm, a plate member mounted on said resilient member, a coil spring having its lower end resting on said plate member and a hydraulic shock absorber pivotally mounted on said upper control arm and supported by said plate member, said hydraulic shock absorber including means supporting the upper end of said coil spring.

5. In a motor vehicle having a sprung portion and a road wheel, upper and lower control arms rotatably mounted on said sprung portion and extending to one side thereof, means associated with the extended ends of said control arms for rotatably supporting said road wheel, a plate element pivotally mounted on said lower control arm intermediate the rotatable mounting of said arm and said wheel, a shock absorber having a laterally extending abutment adjacent its upper end, said shock absorber device being secured at its lower end to said plate element and having its upper end pivotally mounted on said upper control arm intermediate the rotatable mounting of said last-mentioned arm and said wheel and a coil spring having its lower end mounted on said plate element and its upper end mounted on said abutment, said plate element having its pivotal mounting substantially coplanar with the lower end of said spring.

6. In a motor vehicle having a frame, an upper control arm rotatably mounted on said frame, a lower control arm rotatably mounted on said frame, means associated with said control arms for rotatably supporting a wheel, a resilient bumper element supported by said lower control arm, a plate element rockably supported on said bumper element, a coil spring having its lower end portion resting on said plate element and a shock absorber having one end thereof pivotally supported on said upper control arm and the lower end thereof resting on said plate element, said shock absorber carrying an abutment adjacent the pivotal support thereof on said upper control arm, said abutment engaging the upper end of said coil spring.

7. A motor vehicle wheel suspension assembly comprising a bracket adapted to be secured to the sprung portion of a motor vehicle, upper and lower control arms pivotally mounted on said bracket and extending to one side thereof, means associated with the extended ends of said control arms for rotatably supporting said road wheel, the pivotal mounting of said upper control arm being closer to said road wheel than the pivotal mounting of said lower control arm, a plate element pivotally mounted on said lower control arm intermediate the rotatable mounting of said lower control arm and said wheel and remote from the pivotal mounting of said lower control arm, a second element pivotally mounted on said upper control arm adjacent the pivotal mounting of said upper control arm on said bracket and intermediate the rotatable mounting of said last-mentioned arm and said wheel, said second element presenting a surface which extends generally parallel to the plane of said plate element and a coil spring having its lower end mounted on said plate element and its upper end engaging said surface so that said assembly may be secured to said vehicle sprung portion as a preassembled unit.

CHESTER C. UTZ.

REFERENCES CITED

The following references are of record in the file of this patent:

UNITED STATES PATENTS

| Number | Name | Date |
|---|---|---|
| 946,143 | Levedahl | Jan. 11, 1910 |
| 1,861,866 | Knox et al. | June 7, 1932 |
| 1,948,185 | Padgett | Feb. 20, 1934 |
| 2,070,775 | Bell | Feb. 16, 1937 |
| 2,123,088 | Leighton | July 5, 1938 |
| 2,226,406 | Krotz | Dec. 24, 1940 |
| 2,260,634 | Mullner | Oct. 28, 1941 |
| 2,290,923 | Wahlberg | July 28, 1942 |

FOREIGN PATENTS

| Number | Country | Date |
|---|---|---|
| 475,625 | Great Britain | Nov. 23, 1937 |
| 879,440 | France | Nov. 19, 1942 |